UNITED STATES PATENT OFFICE.

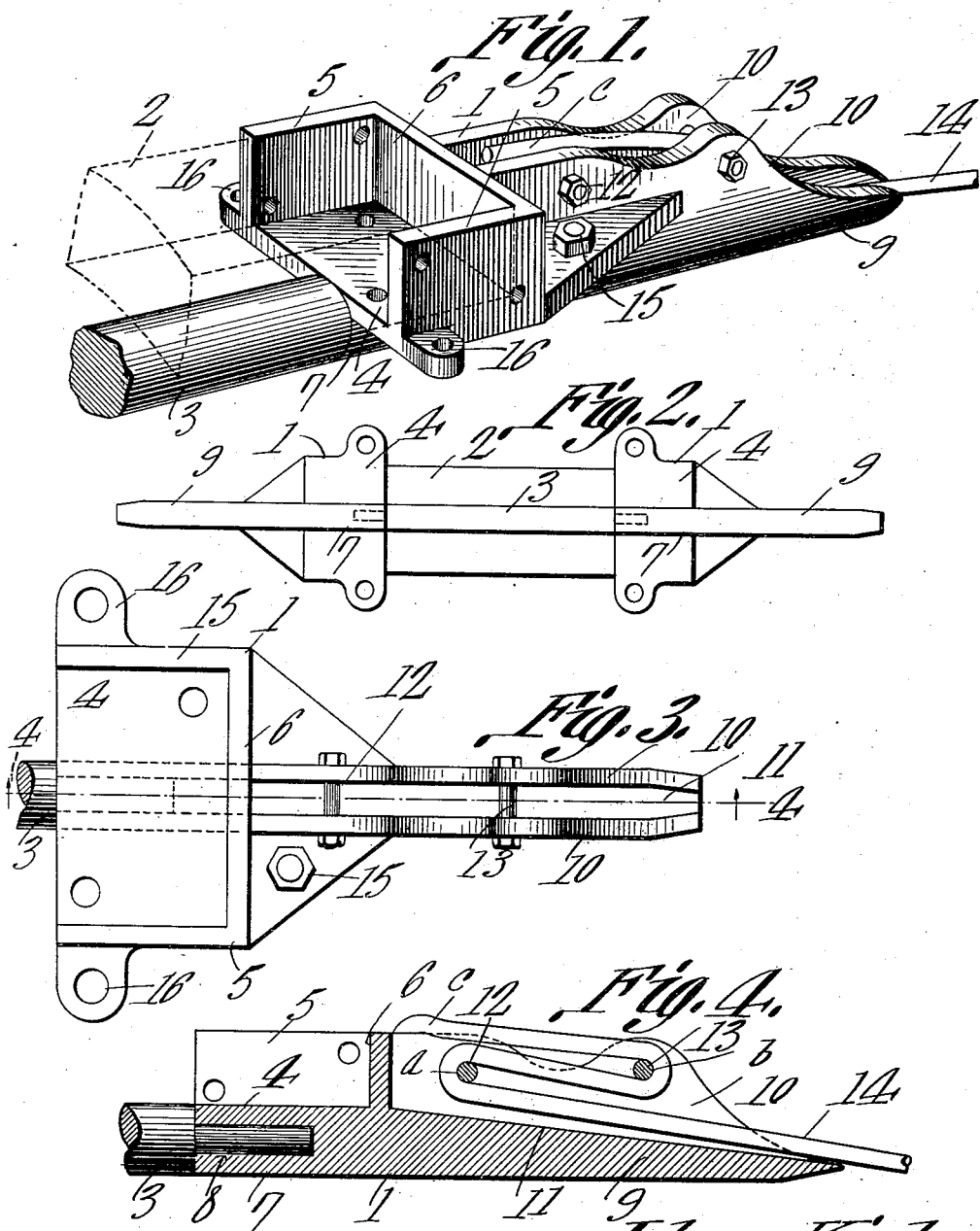

JOHN KIRBY AND JOHN MAYO, OF DOUGLAS, ARIZONA TERRITORY.

TROLLEY-WIRE CONNECTOR.

1,016,016.  Specification of Letters Patent.  Patented Jan. 30, 1912.

Application filed August 28, 1911. Serial No. 646,422.

*To all whom it may concern:*

Be it known that we, JOHN KIRBY and JOHN MAYO, citizens of the United States, residing at Douglas, in the county of Cochise, Territory of Arizona, have invented a new and useful Trolley-Wire Connector, of which the following is a specification.

This invention relates to improvements in trolley connectors, the primary object of this invention being the provision of a connector and circuit breaker for overhead trolleys, the same providing a quick repair and durable device for retaining the free ends of the trolley, and for so connecting the same together as to reduce the sparking effect caused by the jumping of the trolley wheel when crossing at such point, and at the same time permit the use of a wooden bar as a main supporting means thereby producing an economical device and one which can be readily replaced when broken.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a perspective view of one of the end connecting members with the trolley wire in operable relation thereto, the dotted line showing the position of the main connecting wooden bar in place. Fig. 2 is a bottom plan view of a complete connection. Fig. 3 is a top plan view of one of the metal connecting members of the device. Fig. 4 is a section taken on line 4—4 of Fig. 3.

Referring to the drawings, the numeral 1 designates the two metal members of the connecting device, 2 the rectangular in cross section wooden bar for connecting said members relative to each other and forming the main support for the connecting device, and 3 is a tubular trolley wheel guiding connection, which is disposed with relation to the metal connections 1 and upon the underside of the wooden bar 2, as clearly shown in Fig. 2.

Each one of the members 1 are provided with a receptacle 4, having the upstanding parallel walls 5 and the rear wall 6, for the reception of one end of the wooden bar 2, the same being connected thereto by means of screws passed through the apertures as clearly shown in Fig. 1. Formed integral with the members 1 upon the underside thereof is a cylindrical boss 7, provided with the socket 8 for the reception of the reduced portion of the trolley wheel guiding rod 3, the bar 2 holding two metal members 1 and the rod 3 in the relative position as shown in Fig. 2. Formed integral with the tubular boss 7, which in fact is a continuation thereof, is a projection 9. This projection 9 carries the two walls or plates 10, which provide an open ended receptacle with the inclined bottom 11. The studs 12 and 13 span the space between the walls 10 above the bottom 11 and form a means to permit a trolley wire 14 to be passed between the walls 10 and around the pins 12 and 13 as at *a* and *b*, and finally have its terminal *c* fastened to the body of the member 1 to prevent any slipping thereof. Each member 1 is further provided with the binding post 15 whereby the feed wires are connected to the respective metal members. The oppositely disposed eyed lugs 16 are formed integral with the casing 4 and provide connecting means for the side pull connections, not shown, so that the trolley connector will be properly supported.

From the foregoing description taken in connection with the drawings, it is evident that should the wooden bar 2 break or become splintered in any way it will be an easy matter to remove the same and replace it with a new one, and by making the same in the shape as shown, the same is readily fitted in place and provides a protecting and holding means for the trolley wheel guide rod 3 and a separating means for the metal trolley connecting plates or members 1.

What is claimed is:

1. A trolley wire connector, comprising two metal members, each of said members having formed integral therewith, a trolley wire receiving lip, a cylindrical socketed boss contiguous with said lips upon the underside of each member, and an open receptacle upon the upper face thereof, a cylindrical trolley wheel guiding rod having its terminals disposed in the socketed bosses of the trolley wire connecting members, and a strip of insulating material rectangular in cross section of a greater width than the rod having its terminals connected within the receptacles of each trolley wire connecting member for retaining the members and rods in relative position.

2. A trolley wire connector, comprising two wire connecting members, each one having a tapered lip with a wire receiving receptacle therein, the inner portion of said lip terminating in a socketed boss, an interiorly and upwardly opening receptacle provided in each member, a cylindrical wheel guiding rod having reduced terminals fitting within the sockets of the bosses and having its circumference alining with the circumference of the bosses, said rod extending between the members, and a strip of insulating material rectangular in cross section having its terminals seated within the receptacles of the wire connecting members and holding said members and the rods relatively to each other.

In testimony that we claim the foregoing as our own, we have hereto affixed our signatures in the presence of two witnesses.

JOHN KIRBY.
JOHN MAYO.

Witnesses:
BOYD W. KINDEL,
J. P. SEXTON.

Copies of this patent may be obtained for five cents each, by addressing the "Commissioner of Patents, Washington, D. C."